United States Patent [19]
Neuerberg et al.

[11] Patent Number: 5,205,317
[45] Date of Patent: Apr. 27, 1993

[54] VALVE ASSEMBLY

[75] Inventors: Duane P. Neuerberg, South Bend, Ind.; Wannis C. Parris; Keith F. Stelter, both of Niles, Mich.

[73] Assignee: Delta Industrial Valves, Inc., Niles, Mich.

[21] Appl. No.: 861,245

[22] Filed: Mar. 31, 1992

Related U.S. Application Data

[63] Continuation-in-part of Ser. No. 758,639, Sep. 12, 1991.

[51] Int. Cl.⁵ .................. F16K 11/04; F16J 15/40; F16J 15/48
[52] U.S. Cl. .................... 137/242; 137/383; 251/95; 251/214; 251/327; 251/328; 277/72 FM; 277/188 A
[58] Field of Search ............. 137/242, 244, 383, 385; 251/95, 96, 214, 326, 327, 328, 104, 113, 329; 277/165, 188 A, 188 R, 206 R, 59, 72 FM, 27; 15/256.5

[56] References Cited

U.S. PATENT DOCUMENTS

| | | | |
|---|---|---|---|
| 2,731,282 | 1/1956 | McManus et al. | 277/59 |
| 2,774,371 | 12/1956 | Grannenfelt | 137/242 |
| 2,829,862 | 4/1958 | Wey | 137/242 |
| 3,090,218 | 5/1963 | Birkness | 137/383 |
| 3,319,661 | 5/1967 | Shindler | 277/188 R |
| 3,448,762 | 6/1969 | Schmitt | 137/383 |
| 3,710,816 | 1/1973 | Prince | 137/242 |
| 3,933,092 | 11/1976 | Still | 251/328 |
| 4,206,905 | 6/1980 | Dobler | 251/328 |
| 4,886,241 | 12/1989 | Davis et al. | 277/188 A |
| 4,962,785 | 10/1990 | Clifford | 137/383 |

Primary Examiner—George L. Walton
Attorney, Agent, or Firm—James D. Hall

[57] ABSTRACT

A gate valve is provided having a housing with an interior channel, and a gate which slideably engages the channel. The valve includes a peripheral seal, positioned in the channel to prevent the flow of fluid around the edges of the gate. The valve also includes a transverse seal positioned in the housing to prevent the flow of fluid along the planar surfaces of the gate. The transverse seal includes a generally U-shaped casing disposed about a packing material. The packing material maintains pressure against the casing, thus forcing the casing against the gate. The surface of the casing which is adjacent the gate includes a plurality of raised ribs. The casing includes a bottom member, and two oppositely disposed legs. Each leg has a foot at its distal end, extending away from the packing. Scraping blades are positioned adjacent to each leg member and its corresponding foot. The scraping blades clean debris from the gate, and prevent "rolling" of the seal into the channel. The valve also includes a retention pin which can be inserted through a hole in the gate, and through a corresponding pin receptacle in the assembly. The retention pin can be padlocked into position, and prevents translation between the gate and the housing. The pin can be colored, so its position can visually be determined from a distance.

5 Claims, 4 Drawing Sheets

VALVE ASSEMBLY

BACKGROUND OF THE INVENTION

This application is a continuation-in-part of co-pending U.S. patent application Ser. No. 07/758,639, filed Sep. 12, 1991.

SUMMARY OF THE INVENTION

The present invention relates generally to valves. More particularly, the present invention relates to gate valves and more specifically to knife gate valves.

Gate valves have long been known, and have been used in various fields of practice. Generally, a knife gate valve includes an assembly structure or housing and a knife gate or blade. The housing usually includes a channel in which the gate is placed, which guides the gate as it slides within the housing. The valve is also typically provided a stem by which the gate can be moved to various positions within the assembly structure. The assembly structure typically has a bore or port extending therethrough. When the valve is attached to a pipe or fluid supply line, this bore is positioned to align with the opening of the pipe.

When it is desired to let the material flowing in the pipe pass through the valve, the gate is secured within the upper housing, or bonnet, and does not obstruct the flow of the material passing through the pipe! To cut off the flow of the material, the valve is closed by moving the gate until it intersects the bore. Once in the closed position, the gate prevents the passage of the material from one section of the pipe to the next via the bore.

Many different means of actuating the gate have been used, including manual handwheels, manual levers, and hydraulic or pneumatic cylinders with automatic positioners or electrical motors. These actuating means are well known, and exemplary arrangements of such are commercially available from many sources.

Since their introduction, gate valves have been used to control the flow of various types of materials, including coal slurry, pulp, water, chemicals, and gases. Because of the chemical composition of many of these materials and the high pressures at which such materials are forced through the pipes, it is often important that the gate valve provide a tight and effective seal. The need for an effective seal is even more necessary in certain of today's industrial practices. For example, the Environmental Protection Agency continues to increase its standards against leaks of certain chemical or hazardous materials, and, thus, there is typically an increased need for a superior seal.

Two types of sealing arrangements are generally known to be used with gate valves. One such arrangement rests within the recessed groove portion of the assembly which guides the gate. This peripheral seal surrounds the periphery of the gate, and prevents any material from seeping out of the bore and around the gate edges to the external environment. A second seal is typically provided within the assembly of the valve which, in many instances, extends longitudinally across the valve, above the bore, transverse to the gate. This transverse seal constantly contacts the flat side of the gate as it is raised and lowered. This seal is used in order to prevent the flow of material from the pipe into the housing and to prevent external environmental debris from entering the valve. Typically, a gate valve will include two transverse seals, one for each flat side of the gate.

U.S. Pat. No. 3,917,223 to Sidler, et al. shows a valve which includes a scraping blade in conjunction with the transverse seal. This scraping blade is positioned adjacent to the transverse seal to additionally clean and wipe the gate as it is raised between a lowered position and a raised position.

The scraping blade used in the Sidler patent is positioned against the gate by a round, elastomeric cord stock. This arrangement has been found to have at least two limitations. In this configuration, it is common for the scraping blade to slip off of the cord stock, as there is no means used for securing the two bodies together. Once out of position, the scraping blade applies no cleaning force against the surface of the gate.

As a second drawback, the Sidler arrangement is highly susceptible to "rolling." Rolling occurs when the seal or cord stock is pulled out of position and into the housing channel by the gate. Rolling can also occur when a small protrusion or lip on the seal is pulled out of position and is forced back on top of the seal. This overlapping portion protrudes into the channel, and will soon crumble and break away from the constant wear applied by the gate. The seal used in the '223 patent to Sidler has such a lip, and is therefore susceptible to rolling. Rolling can also occur when the valve is being used to control the flow of an adhesive material. It is common that tar or other sticky substances adhere to the surface of the knife gate, after the gate is retracted back into the upper housing. If the seal contacts and adheres to these substances, movement of the gate can pull the entire seal into the channel. This can ruin the sealing and cleaning effect of the transverse seal. Furthermore, rolling can inhibit the motion of the gate within the housing. Commonly, the seal rolls and fatigues at its corners as a result of disfigurement or displacement caused by rolling. Thus, the transverse seals of known construction often have a relatively short life expectancy, and need to be replaced frequently.

The transverse seal arrangements of the known prior art are also deficient in other respects. First, the seal arrangements currently known are often not completely effective against preventing materials from seeping from the pipe into the bonnet, and then into the surrounding environment. The design and configuration of the transverse seal arrangement can be critical to preventing the flow of material into the valve housing. Because of the high pressure exerted by the transverse seal on the valve gate, there can be extensive wear of the transverse seal. As the gate is actuated, it rubs against the surface of the transverse seal, causing wear to the seal. After time, the seal becomes less effective at stopping the flow of fluids. Thus, the design of the transverse seal itself is critical.

Replacing known transverse seals is typically not a simple process. In most instances, the valve must be disassembled, and a transverse seal is cut to fit each valve body half. The seal is then filled with a packing material. This process must be repeated for the second valve body half, and then the two body valves are secured together. Of course, during this entire process, the valve has been removed from the pipe line which it serves. Because of the time and inefficiencies involved in replacing the transverse seal, it is highly desirable to construct a transverse seal with a long life expectancy.

Another disadvantage of some known gate valve arrangements is that the mechanism to retain the gate in an open or closed position. It is often advantageous when using gate valves to have a means for retaining the gate in the open or closed position. For example, such a retention mechanism would prevent vandals from changing the position of the gate within the valve. The retention mechanism could also be used to prevent accidental or unintentional disengagement of the gate. Also, a retention mechanism may be necessary to keep the gate in a closed or open position, depending on the requirement for fluid flow through the pipe.

Another drawback of known knife gate valves is that it is often difficult to tell from a distance whether the valve is in an open or closed position. These valves are often placed in positions which are not easily accessible. Often, for example, these valves may be suspended from high ceilings, and a person would need to climb a ladder to turn the valve stem to confirm whether the valve is in an open or a closed position. Typical knife gate valves do not allow a person to visually determine, while standing on the floor of the building, if the valve is in an open or a closed position.

Thus, an object of the present invention is the provision of a gate valve with an effective seal against leaking of the material flowing through the pipe.

Another object of the present invention is to provide a gate valve with an improved transverse seal which prevents the flow of material into the housing of the valve and into the surrounding environment.

Still another object of the present invention is to provide a gate valve which effectively cleans the gate as it is raised and lowered through the valve housing.

A further object of the present invention is to provide a gate valve with a scraping blade which will not easily become dislodged.

Another object of the present invention is to provide a gate valve with a transverse seal which is not susceptible to rolling.

A still further object of the present invention is to provide a gate valve with a retention mechanism which is easily accessible and prevents any substantial movement of the gate within the assembly.

Yet another object of the present invention is to provide a gate valve which includes a means for determining from a distance whether the valve is in an open or a closed position.

These and other objects of the present invention are attained by the provision of a gate valve having a housing, and flat gate which is slideably positioned in the housing. An elastomeric cord stock is positioned around the periphery of the gate, and protects against leakage of material around the gate edges. A transverse seal is located within housing on either side of the gate, and is in constant contact with the flat sides of the valve gate. This transverse seal comprises a pliable casing of a generally U-shaped cross section having a bottom member which contacts the valve gate, and two oppositely disposed leg members. The bottom member can be provided with a plurality of raised ribs which form several contact surfaces with the gate. A packing material rests within the cavity of the casing, to provide support and pressure on the casing member. The oppositely disposed leg members include outwardly projecting feet at their distal ends. A rigid scraping blade is placed adjacent to each leg member and against its corresponding foot, such that the edge of the scraping blade contacts the gate. Each valve includes two transverse seal arrangements as described, one each on either side of the gate.

The gate valve of the present invention also includes a retention mechanism which secures the gate in an open or a closed position. The gate includes a small hole therethrough, and the valve housing has a series of pin receptacles. When the gate is in a desired location, a retention pin is inserted through corresponding pin receptacles in contact with the gate. The pin is marked or otherwise made visually distinguishable, which allows a person viewing the valve from a distance to determine the position of the knife gate. Such markings may include painting the pin with a fluorescent or brightly colored paint.

Other objects, advantages and novel features of the present invention will become apparent in the following detailed description of the preferred embodiments of the invention when considered in conjunction with the accompanying drawings.

DESCRIPTION OF THE PREFERRED EMBODIMENTS

Figure 1:
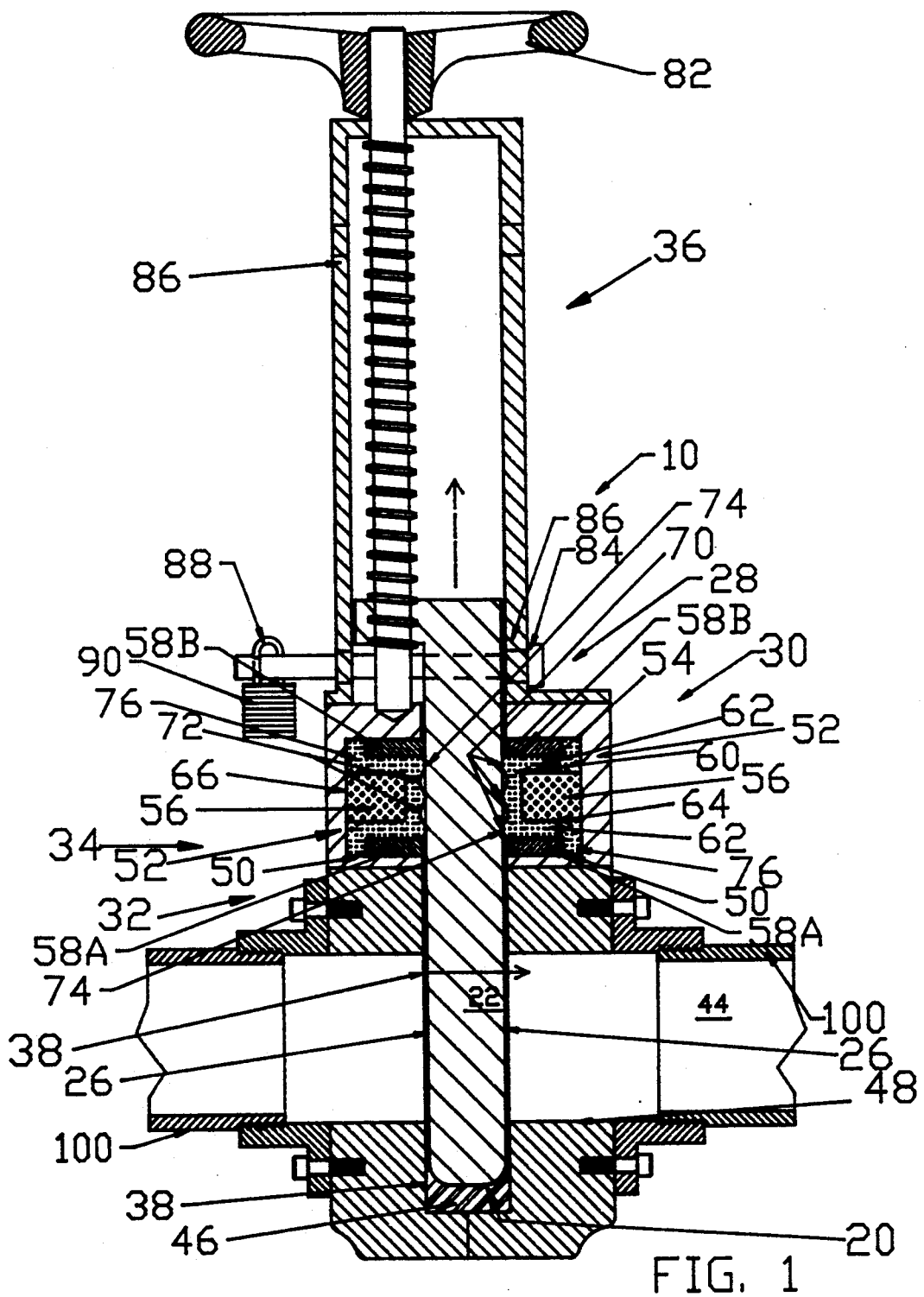
FIG. 1 is a cross section side view of the knife gate valve of the present invention.

Referring now to the drawings, in which like referenced characters indicate corresponding elements throughout the several views, attention is first directed to FIG. 1, which illustrates a preferred embodiment of a gate valve 10 according to the present invention. Gate valve 10 generally includes gate 20 and housing 30. Housing 30 is preferably constructed from an anti-corrosive, heavy duty metal, such as stainless steel, as it may be subjected to the environmental elements as well as various chemical compounds. Housing 30 generally includes body 32, chest 34 and top structure or bonnet 36, with gate receiving channel 38 extending throughout the interior of the housing, which houses gate 20. Body 32 includes the portion of housing 30 through which pipe bore 44 passes. When knife gate valve 10 is connected between two sections of pipe 100, the valve is positioned so that pipe 100 aligns with pipe bore 44. Thus, material flowing through the pipe 100 may freely flow through valve assembly 30, and into the next section of pipe.

The gate 20 is a generally flat, rectangular plate. Gate 20 is preferably made from a chemical-resistant, heavy-duty metal, such as stainless steel. The side edges 22 of gate 20 narrowly fit into gate receiving channel 38, allowing one-dimensional movement of gate 20 within valve assembly 30. This narrow fit reduces the leakage of fluid from pipe 100 into housing 30. Gate 20 is movable into body 32 of housing 30, so as to completely block pipe bore 44. When in this position, gate 20 prevents the flow of the material through housing 30. Gate 20 may also be positioned within chest 34 and bonnet 36 of assembly 30. In this position, gate 20 does not interfere with pipe bore 44, or the flow of material therethrough.

Due to the nature of the function of knife gate valve 10, it is important that the valve prevent the flow of fluid into the housing or surrounding environment. Knife gate valve 10 of the present invention accomplishes this through two different seal arrangements. The first of these is peripheral seal 46. This seal is preferably comprised of a round elastomeric chord stalk. Peripheral seal 46 is located in gate receiving channel 38, such that the side edges 22 of gate 20 are constantly in contact with peripheral seal 46. The seal is packed to tightly fit against the side edges 22 of knife gate 20, and prevent the flow of material around the gate. When gate 20 is in the closed position to block the flow of material, the bottom edge 24 of gate 20 also contacts peripheral seal 46. Thus, the bottom edge 24 and side edges 22 of gate 20 are well sealed against leakage.

Figure 2:
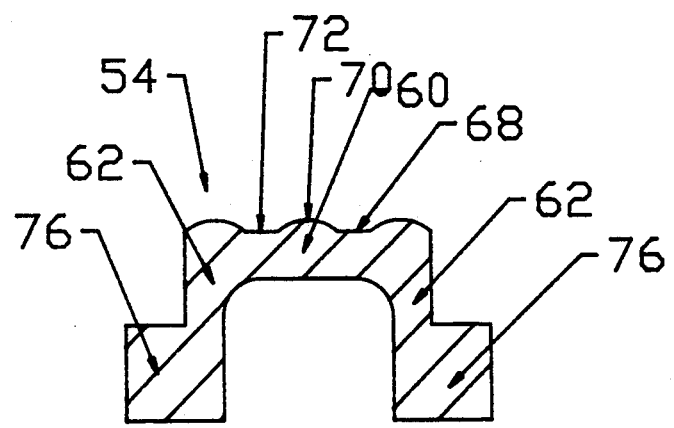
FIG. 2 is a cross section side view of the transverse seal used in the present invention.

Body 34 includes a pair of oppositely disposed, inwardly cut notches 50. These notches are shown in FIG. 2. Each notch 50 extends longitudinally the width of housing 30. Positioned within notch 50 is the second type of seal employed by the present invention. This seal is transverse seal 52. Transverse seal 52 spans the entire width of gate receiving channel 38 and prevents leakage along the planar surfaces 26 of gate 20.

Transverse seal 52 generally comprises three components: casing 54, packing 56, and scraping blades 58. Casing 54 has a substantially U-shaped cross section, and is preferably made from a pliable, anti-corrosive material, such as Buna-N. Other preferred materials include Viton and EPDM. Buna-N can be used in most standard applications, under conditions of mild abrasion and temperature. EPDM is also preferred in applications of mild abrasives and lower temperatures, and is preferred in food grade applications. Viton is preferred in applications where there are higher temperatures, or a need for greater chemical resistance. Casing 54 can also be formed from a more rigid material, such as teflon. In these instances, it is preferred that virgin teflon be used. Virgin teflon is a preferred material when a valve is used in food processing or high temperature applications.

Casing 54 includes a bottom member 60, and two oppositely disposed leg members 62, which extend transverse to bottom member 60 from its opposite ends. These three members generally form interior cavity 64. Leg members 62 are placed in notch 50, and abut the back wall 66 of notch 50, leaving bottom 60 exposed to gate receiving channel 38.

Bottom 60 includes raised ribs 70 thereon, which extend into gate receiving channel 38. Each rib 70 contacts gate 20 along a narrow area of surface contact 74. Because there are a plurality of narrow strips of contact 74, the pressure exerted by casing 54 onto gate 20 is concentrated to more specific areas. As there is less surface contact between casing 54 and gate 20, this also decreases the rate at which the casing 54 are worn. In addition, as casing 54 is worn over time from the constant force applied by gate 20, it is ribs 70 which are being worn. The area of contact 74 between ribs 70 and gate 20 thus increases as ribs 70 are worn. Once ribs 70 are completely worn, bottom member 60 acts as a single, larger area of surface contact. After completing a series of tests, it has been shown that the average life span of the transverse seals known in the prior art is approximately 400-3500 actuations. The seal of the present invention can have a life span of approximately 5,000-15,000 actuations.

To provide pressure against casing 54, packing material 56 is disposed within cavity 64. Preferably, the packing is of a putty type consistency and is preferably made of ground teflon and petroleum jelly. Packing material 56 supports and maintains the shape and position of casing 54 against gate 20. Packing 56 further ensures that pressure is maintained by casing 54 against gate 20.

As is commonly used in valves, threaded screws are threaded into housing 30, and are used to vary the pressure packing 56 exerts on casing 54. As such screws are tightened, they compress packing 56 within interior cavity 64. This increases the pressure packing 56 applies to casing 54, and in turn, against gate 20. Thus, the pressure of casing 54 against gate 20 can be monitored by varying the pressure on packing material 56 applied by the threaded screws.

Transverse seal 50 also includes scraping blades 58. In the preferred embodiment shown, two scraping blades 58 are used in conjunction with each transverse seal. Scraping blade 58 is preferably a substantially rigid member having a generally rectangular cross section. Preferably, scraping blade 58 is made from fiberglass filled phenolic. Typically, scraping blade 58 is made from phenolic for use in mild, low temperature applications. Scraping blade 58 may be made of stainless steel or any other comparable material for use in high temperature and food grade applications.

Scraping blade 58 is placed adjacent to leg members 62, but outside of casing cavity 64. Scraping blade 58 fits snugly into the angle provided by leg member 62 and its corresponding foot 76. Foot 76 extends from the terminal end of leg member 62 parallel to bottom member 60, but away from cavity 64. This configuration produces the angle into which scraping blade 58 is positioned. Scraping blade 58 is dimensioned such that it protrudes slightly into gate receiving channel 38, similar to ribs 70 on casing 54. Thus, scraping blade 58 is in contact with gate 20.

The positioning of scraping blades 58 with respect to leg 62 and foot 76 is important for two reasons. First, foot 76 provides positioning support for scraping blade 58. With this configuration, there is constant contact between foot 76 and scraping blade 58.

The second important feature of this configuration is that it prevents "rolling." The present invention solves this problem by positioning foot 76 behind scraping blade 58. Scraping blades 58 secures casing 54 within notch 50 by trapping foot 76 against back wall 66 of notch 50. Scraping blade 58 also serves to clean material and debris from the planar surface 26 of gate 20. When gate 20 is in the closed position, it will come into contact with the flowing material. As the gate is raised into chest 34, the inboard scraping blade 58 wipes any standing debris from planar surface 26 of gate 20. Thus, none of the abrasive material flowing through pipe 100 is allowed to contact adjacent casing 54. Outboard scraping blade 58 cleans debris from gate 20 as it is lowered from bonnet 36 into body 32. Outboard scraping blade 58 thus cleans debris from gate 20 which has collected from the surrounding environment, and prevents this debris from entering body 32. This environmental debris can also be very damaging to the life of transverse seal 52. Thus, this dual scraping blade system, with a scraping blade 58 located at opposite sides of casing 54, increases the cleaning efficiency and the life of transverse seal 52.

The increased sealing efficiency of the present invention should now be clear. When valve 10 is closed, gate 20 slides within gate receiving channel 38 until it entirely blocks pipe bore 44. No material is able to pass through valve 10. Peripheral seal 46 prevents any seepage from occurring around the side edges 22 of gate 20, and transverse seal 52 denies the flow of material along the planar surfaces 26 of gate 20. Thus, no material can leak into chest 34 or the surrounding environment. When the valve is open, gate 20 retreats into chest 34 and bonnet 36, and does not inhibit the flow of material through the valve. As the gate is pulled into chest 34, inboard scraping blade 58 cleans any material from the planar surface 26 of gate 20. Gate 20, fully cleaned, is then housed in bonnet 36 until valve 10 is again closed. When closing valve 10, gate 20 is lowered from bonnet 36 into body 32. During this motion, outboard scraping blade 58 removes any debris which is collected on gate 20 from the surround environment.

Many means may be used to move the gate 20 within the gate receiving channel 38. However, as the peripheral seal 46 and transverse seal 52 exert high pressures on the gate 20, a substantial force may be required to move the gate. In the preferred embodiment as shown in FIG. 1, a manual handwheel 82 is used. Hand wheel 82 is attached to stem 80, which extends from the top of gate 20. By turning handwheel 82, gate 20 can be raised or lowered. Other devices, such as a cylinder or motor actuator (not shown), may be used.

Once gate 20 is in the desired position, it may be beneficial to secure the gate in place. The present invention includes a retention mechanism for securing the position of gate 20. The retention mechanism includes locking hole 28, which is provided in gate 20, a retention pin 84, and a plurality of pin receptacles 86 within bonnet 36.

When gate 20 is in a desired position, retention pin 84 can be placed through locking hole 28 and into the corresponding pin receptacle 86. This prevents any movement between gate 20 and valve housing 30. A padlock 90 can then be attached to retention pin 84 to prevent disengagement of the pin from locking hole 28 and pin receptacle 86. In the preferred embodiment shown, retention pin 84 further includes a shackle bore 88 through which the padlock can be secured to the locking pin.

It is often advantageous to be able to visually determine, from a distance, whether a knife gate valve is open or closed. The retention mechanism of the present invention provides the means to make this determination. One can see if retention pin 84 has secured gate 20 in an open or closed position. This visual determination is enhanced by marking retention pin 84 with a bright or fluorescent paint. The precise location of the pin can then be readily determined.

Figure 3:
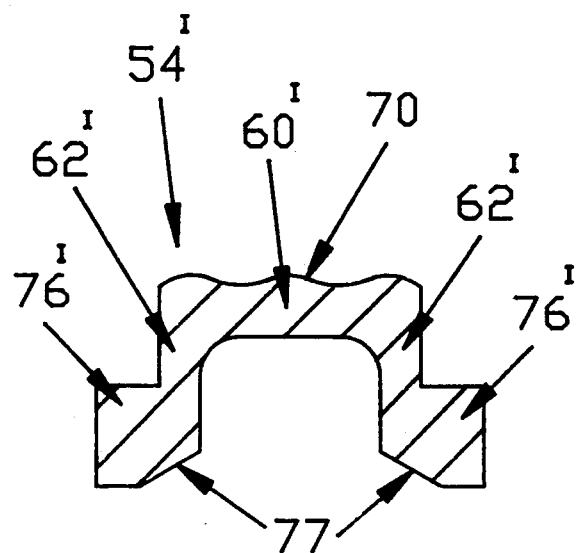
FIG. 3 is a cross-sectional view of a preferred embodiment of the transverse seal used in the present invention.
Figure 5:
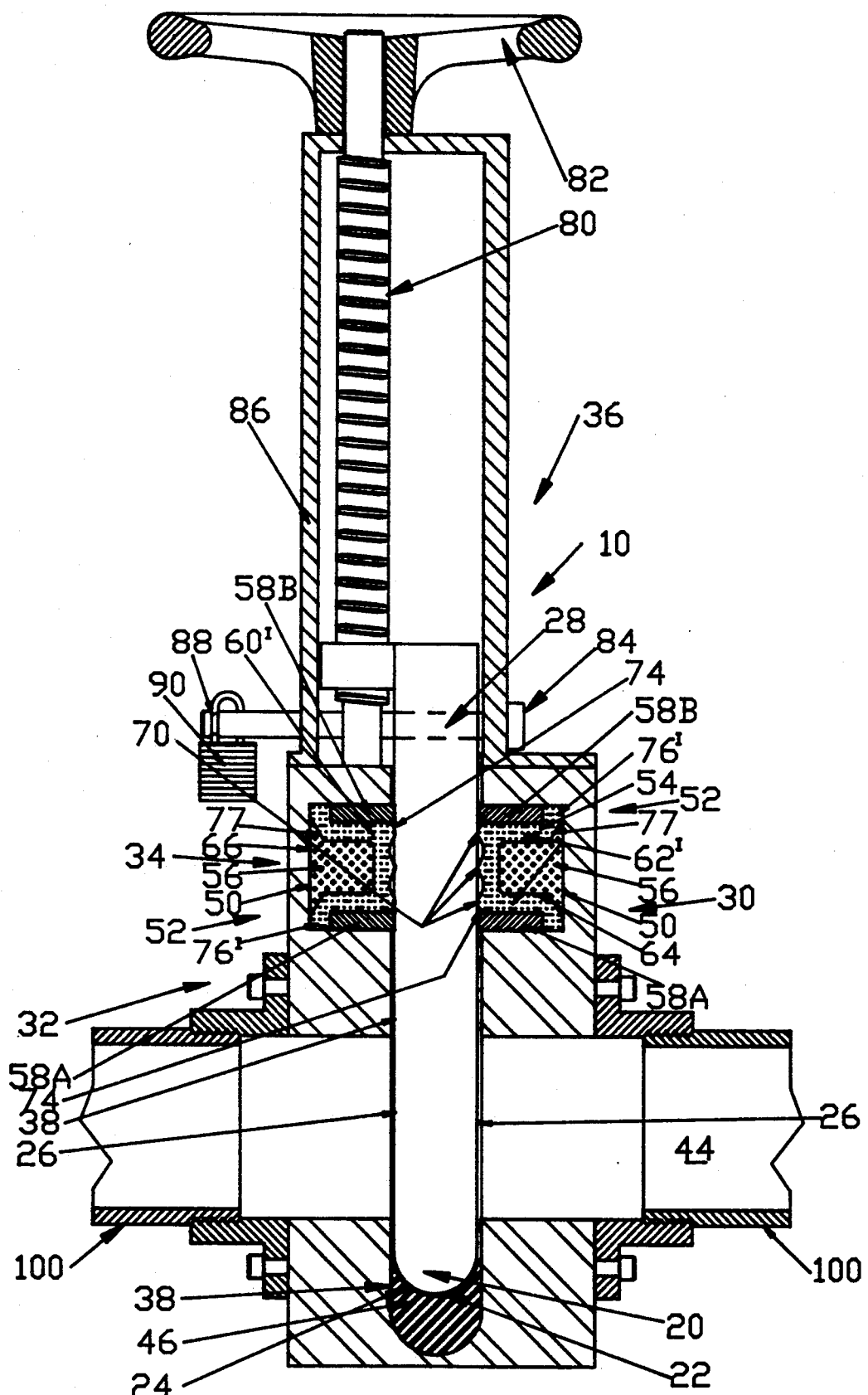
FIG. 5 is a cross-section side view of the knife gate valve having the transverse seal of FIG. 3.

In the preferred embodiment as shown in FIG. 5 and FIG. 3, each foot 76' of casing 54' includes a bevel 77. FIG. 5 is a longitudinal cross sectional view of the knife gate valve illustrating the casing 54' of FIG. 3 as installed in the valve. The elements or parts of the valve of FIG. 5 are the same as those shown for the valve of FIG. 1 except for the bevelled portion of the casing. Thus, the similar corresponding elements of FIG. 1 and FIG. 5 will function the same and will be referred to by the same reference numerals. Bevel 77 allows a small portion of packing material 56 to seep under foot 76'. Thus, packing material 56 not only provides pressure within the interior of casing 54', but it also provides pressure under each foot 76' which inturn more forceably urges each scraping blade 58 outwardly.

Figure 4:
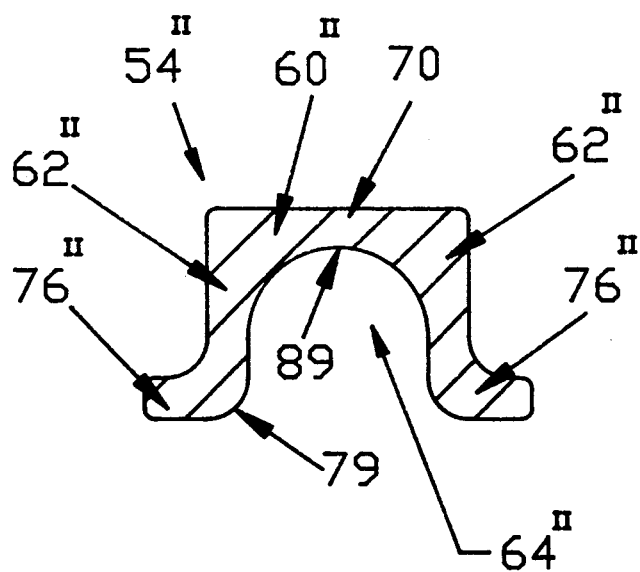
FIG. 4 is a cross-sectional view of a preferred embodiment of the transverse seal used in the present invention.

In another embodiment as seen in FIG. 4, casing 54" includes radius 89. Radius 89 is a curved surface found on bottom member 60", which opens into cavity 64". The pliable nature of packing material 56 allows it to conform to the shape of cavity 64", including the shape of radius 89. Radius 89 allows packing material 56 to provide more uniform and consistent pressure against casing 54". Leg member 62" includes a foot 76". Foot 76" extends from the terminal end of leg member 62" parallel to bottom member 60", but away from cavity 64". Foot includes rounded portion 79 which allows a small portion of packing material to seep under foot 76". The casing 54" functions in the similar manner as that of casing 54" of FIG. 3.

Although the present invention has been described above in detail, the same is by way of illustration and example only and is not to be taken as a limitation on the present invention. The scope and content of the present invention are defined only by the terms of the claims appended hereto.

What is claimed:

1. A valve having a housing and a generally flat gate movable therein between open and closed positions, a transverse seal including a generally U-shaped casing having a bottom member and two oppositely disposed leg members, said bottom member and leg members generally defining a cavity therebetween, packing material disposed generally within said cavity supporting said casing and providing pressure against said casing in the direction of said gate when said gate is in said open and closed positions, each leg member including a foot extending generally longitudinally outward of said cavity from the terminal end of said leg, and a scraper blade in contact with said gate and fitted restrictively between said housing and one of said leg members of the casing in overlying abutting contact with the foot of said one leg member, said last mentioned foot constituting means for biasing said contacting scraper blade into contact with said gate when in its said open and closed positions, said last mentioned foot including a bevel therein, said packing material within said cavity positioned behind said bevel and constituting means for pushing outwardly on said casing and said last mentioned foot thereof to urge said casing and said scraper blade outwardly for maintaining a more effective seal and scraping contact with said gate.

2. The valve according to claim 1, and including a second scraping blade restrictively positioned between said housing and the other of said leg members of the casing in overlying abutting contact with the foot of said other leg member, said last mentioned foot constituting means for biasing its said contacting scraper blade into contact with said gate when in its said open and closed positions, said last mentioned foot including a bevel therein, said packing material within said cavity positioned behind said last mentioned bevel and constituting means for pushing outwardly on said casing and said last mentioned foot thereof to urge said casing and said last mentioned scraper blade outwardly for maintaining a more effective seal and scraping contact with said gate.

3. The valve according to claim 2, wherein said casing includes a plurality of raised ribs located on said bottom member opposite said cavity in contact with said gate.

4. The valve according to claim 3 including a locking pin for securing said gate and limiting motion of said gate with respect to said housing, at least one hole located in said gate for accepting said locking pin at least one pin, receptacle located in said housing for accepting said locking pin.

5. The valve according to claim 4, wherein said locking pin is marked such that its location in said housing is visible from a distance.

* * * * *